July 21, 1936.  J. SNEED  2,048,574
BRAKE SHOE
Filed Sept. 9, 1929
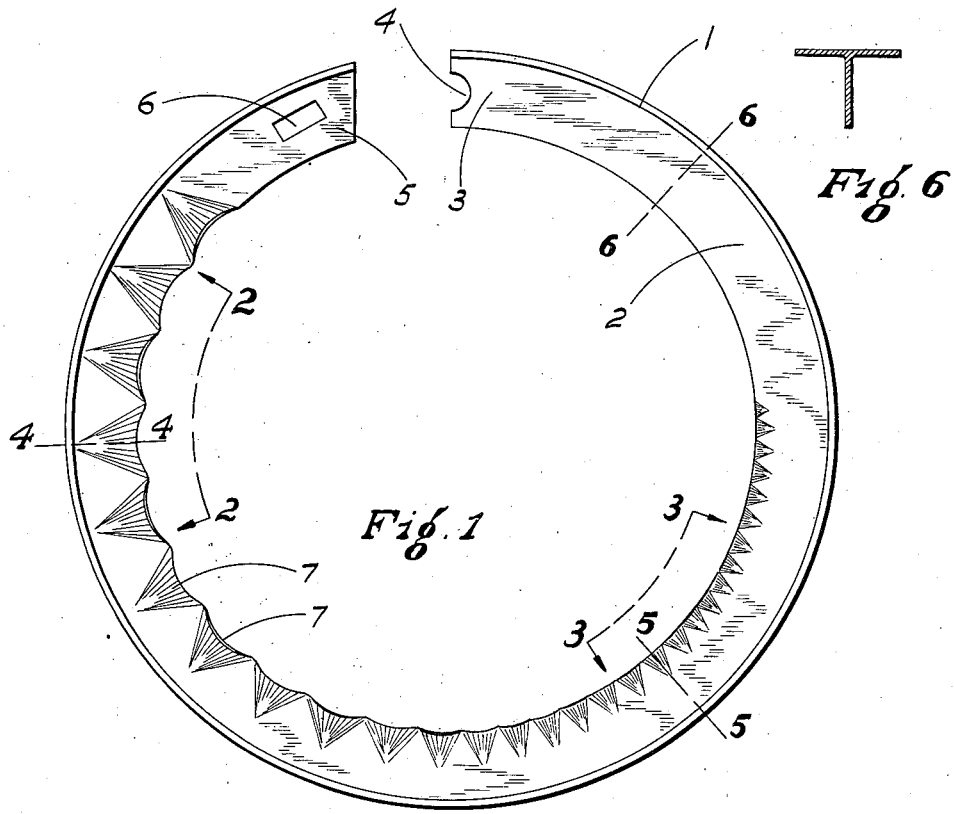
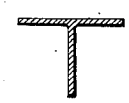
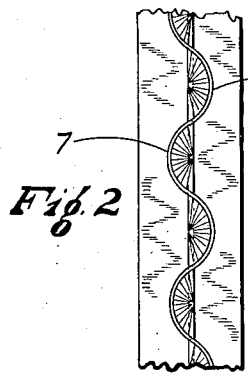
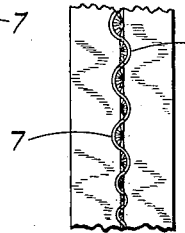
Inventor
JOHN SNEED.
By
Attorney Patented July 21, 1936

2,048,574

UNITED STATES PATENT OFFICE 2,048,574

BRAKE SHOE

John Sneed, Ferndale, Mich., assignor to The Midland Steel Products Company, Cleveland, Ohio, a corporation of Ohio, as trustee for Steeldraulic Brake Corporation, Detroit, Mich., a corporation of Michigan Application September 9, 1929, Serial No. 391,198

22 Claims. (Cl. 188—250)

This invention relates to brakes and more particularly to brake shoes for self-energizing automotive brakes.

In my copending United States patent applications Serial No. 2,715 filed January 16, 1925 and Serial No. 347,515, filed March 16, 1929, I have fully described and claimed a brake having a brake shoe with characteristics of rigidity and flexibility and it is among the objects of my invention to provide an improved brake shoe of this general type.

It is desirable in the type of brake disclosed in my above mentioned applications that the brake shoe be substantially non-flexible in portions of its circumferential length and flexible in other portions. My invention provides these flexible and non-flexible sections and permits any particular section of the brake shoe to be given any described degree of flexibility.

In the drawing, Fig. 1 is a side elevation of one form of my brake shoe; Fig. 2 is a fragmentary view taken on the line 2—2 of Fig. 1; Fig. 3 is a fragmentary view on the line 3—3 of Fig. 1; Fig. 4 is a section on the line 4—4 of Fig. 1; Fig. 5 is a section on the line 5—5 of Fig. 1; and Fig. 6 is a section on the line 6—6 of Fig. 1.

The brake shoe illustrated in Fig. 1 has a substantially annular lining supporting face 1 and an inwardly extending reinforcing web or flange 2. One end 3 of the web 2 is provided with a semicircular cut out portion 4 which is adapted to engage an anchor pin when the shoe is assembled in a brake mechanism and the other end 5 may be provided with a slot 6 to facilitate the attachment of brake adjusting means.

I prefer to form my improved brake shoe from a straight blank of T section steel by rolling it into the desired circular form by means of any suitable mechanism. However, if a T section blank be rolled into an open circle without some further operation, such as cutting away part of the web, it will not possess the desired property of varying flexibility. To secure this flexibility I corrugate the web 2, as indicated at 7 on the drawing.

In the shoe illustrated these corrugations 7 do not start at the end 3 of the shoe, thus providing a substantially non-flexible portion adjacent that end of the shoe. The corrugations at the right hand side of the shoe (Fig. 1) are comparatively shallow and, as they progress around the shoe toward the end 5, become gradually deeper. By forming the corrugations 7 in the web 2 in this manner the shoe flexibility increases from the substantially non-flexible portion adjacent the end 3 to the end 5. Figs. 3 and 5 illustrate the shallow corrugations and Figs. 2 and 4 the deeper ones. The most flexible portion of the brake shoe will occur at the point where the corrugations are deepest.

This type of brake shoe is particularly adapted to economical manufacture because the shoe may be rolled into its circular shape and the web corrugations all formed in the same operation by suitable rolls.

Although I have illustrated and described herein a preferred form of my invention in which the corrugations are of varying depths and widths to secure the desired varying flexibility of the brake shoe, it will be clear to those skilled in the art that the shoe, spacing and depth of the corrugations may be varied to give any desired degree of flexibility to any particular part of the shoe. Such modifications in my invention may be made without departing from the spirit thereof and I do not wish to be limited in the scope of this patent in any manner other than by the claims appended hereto.

I claim:—

1. A brake shoe having a lining supporting face portion and an inwardly extending radially corrugated web, the web intersecting the lining supporting portion substantially in a single plane.

2. A brake shoe having an inwardly extending reinforcing web, said web having radially corrugated and non-corrugated portions.

3. A brake shoe having a face portion and a reinforcing portion, said reinforcing portion being radially wrinkled in part to provide flexibility according to depth and extent of the wrinkles.

4. A brake shoe having a substantially non-flexible portion and a relatively flexible portion, said non-flexible portion being reinforced by a flat web and said relatively flexible portion being reinforced by a corrugated web.

5. A brake shoe comprising an expansible ring cut through at one point and a radially corrugated reinforcing rib extending inwardly from said ring.

6. A brake shoe of T shaped cross section having an inwardly extending web, said web being wrinkled in part radially along the marginal edge thereof.

7. A brake shoe of T shaped cross section having an inwardly extending web, said web having corrugations of different dimensions intermediate its ends.

8. A brake shoe of T shaped cross section having an inwardly extending radially corrugated web with an arcuate anchor engaging portion.

9. A brake shoe comprising a ring cut through at one point and having a web extending inwardly from said ring, said web having portions at each end lying in one plane and a corrugated portion intermediate said end portions.

10. A brake shoe comprising a ring cut through at one point and a web extending inwardly from said ring, said web having flat portions at each end and an intermediate portion having corrugations whose dimensions gradually increase from a point adjacent one end portion to a point adjacent the opposite end portion.

11. A brake shoe comprising a split ring having an inwardly extending web, said web being radially corrugated for a portion of its length.

12. A brake shoe comprising a split ring having an inwardly extending web, said web having a series of corrugations of varying dimensions to give different degrees of flexibility to different sections of said shoe.

13. A brake shoe comprising a split ring having an inwardly extending reinforcing web having one end adapted to abut against an anchor pin, a flat portion extending circumferentially from said anchorable end, a corrugated portion adjacent said flat portion and a second flat portion adjacent the other end of said web.

14. A flexible brake shoe having a corrugated reinforcing web, the corrugations extending in directions to increase the flexibility of the web.

15. In a flexible brake shoe a radially corrugated reinforcing web of varying degrees of flexibility.

16. A brake shoe having a web formed in a series of gradual curves in part, said curves extending in directions away from the general plane of the web.

17. A brake shoe having an inwardly extended reinforcing flange, said flange having a sequence of undulations therein, the undulations in the flange being smaller in the region adjacent the periphery of the shoe than in the inner edge of the flange.

18. A brake shoe made up of T-section stock having a lining supporting flange and a radial rib, said rib having in place thereof a sequence of undulations therein decreasing in size toward one end of the shoe.

19. A brake shoe having a lining supporting flange and a radial rib, the marginal edge of said rib being formed in gradual curves, the said curves lying in a surface substantially perpendicular to the general plane of the rib.

20. A brake shoe having a lining supporting flange and a radial rib, the lateral surfaces of said rib adjacent the marginal edge thereof being formed in gradual curves decreasing in radius toward one end of the shoe whereby varying degrees of flexibility are imparted to different sections of the shoe.

21. A friction element comprising a rim and a reinforcing web gradually increasing in overall thickness from its line of engagement with the rim to the edge farthest removed from the rim.

22. A brake shoe comprising a metal section having an arcuate flange portion and a web portion integral therewith throughout the length of the web, the web portion having laterally displaced radially-extending parts not deflected at all immediately adjacent the flange portion and deflected further from the plane of the web the further they extend from the flange portion, whereby to cause the flange portion to bend on a cylindrical curve, and being of the same overall length as the flange portion.

JOHN SNEED.